United States Patent [19]

Becker et al.

[11] Patent Number: 5,110,006

[45] Date of Patent: May 5, 1992

[54] HEAT INSULATION SYSTEM FOR SURFACES ALONG WHICH A HOT GAS STREAM IS CONDUCTED

[75] Inventors: Gerhard Becker, Mannheim; Hans-Gunter Gross, Heidelberg; Johannes Henssen, Geilenkirchen; Josef Schöning, Hambrucken, all of Fed. Rep. of Germany

[73] Assignee: Hochtemperatur Reaktorbau GmbH, Ortmund, Fed. Rep. of Germany

[21] Appl. No.: 570,627

[22] Filed: Aug. 21, 1990

[30] Foreign Application Priority Data

Aug. 22, 1989 [DE] Fed. Rep. of Germany ....... 3927624

[51] Int. Cl.⁵ ............................................. B65D 7/42
[52] U.S. Cl. ................................... 220/442; 220/445; 220/901
[58] Field of Search ............... 220/470, 442, 445, 451, 220/901

[56] References Cited

U.S. PATENT DOCUMENTS

| | | | |
|---|---|---|---|
| 3,670,917 | 6/1972 | Nishimaki et al. | 220/901 X |
| 3,907,151 | 9/1975 | Gilden | 220/445 X |
| 3,920,518 | 11/1975 | Brissaud et al. | 220/442 X |
| 3,958,714 | 5/1976 | Barriere et al. | 220/442 |
| 3,970,210 | 7/1976 | Katsuta | 220/901 X |
| 4,165,021 | 8/1979 | Dörling | 220/445 X |
| 4,366,917 | 1/1983 | Kotcharian | 220/442 |

Primary Examiner—Steven M. Pollard
Attorney, Agent, or Firm—Robert J. Koch

[57] ABSTRACT

A heat insulation system may protect surfaces along which a hot gas stream is conducted. The insulation may be several plies of slightly compressed ceramic fiber mats, separated by intermediate plates. Cover plates are attached to the hot side. The cover plates are mounted by holding bolts on the support structure carrying the insulation. The support structure may be the liner of a nuclear reactor pressure vessel. Thickness and size of the cover plates are optimized with regard to the stresses occurring at the edges of the holes provided for the holding bolts to ensure dimensional stability of the fiber mats and the functional capability of the metallic mounting system during a long period of time. Several sealing sleeves may be arranged on each holding bolt. In a first solution, some intermediate plates exhibit lug-shaped points stamped out of the plates on both sides in vertical areas of the heat insulation system. The lug-shaped points which transfer the forces of the fiber mats to the intermediate plates. In a second solution, the function of these intermediate plates may be taken over by layers of expanded metal arranged between the fiber mats.

16 Claims, 2 Drawing Sheets

HEAT INSULATION SYSTEM FOR SURFACES ALONG WHICH A HOT GAS STREAM IS CONDUCTED

BACKGROUND OF THE INVENTION

1. Field of the Invention

The invention relates to a heat insulation system for surfaces along which a hot gas stream is conducted.

2. Description of the Related Technology

Heat insulation systems may be used in nuclear power station construction for heat protection of the prestressed concrete pressure vessel enclosing the nuclear reactor. Insulation may be used for protecting gas conduits in which the heated gas coming from the nuclear reactor is conducted to the further components of the primary circuit. In the first case, the heat insulation system is attached to a liner of the pressure vessel cavern as the support structure. In the second case the heat insulation system is the pressure jacket of the gas conduits.

The heat insulation system must be designed in such a manner that a failure can be reliably excluded for the entire operating period under the loads acting on the system (essentially its own weight, pretension forces, acoustical and flow-induced vibration excitation and water after an accident).

The functional capability, that is to say the insulating effect of the insulating material can be considered to be ensured if the insulating material does not change its position between the support structure and the cover plates. Cavities formed in the heat insulation system due collapsing or slipping-down of the insulating material must be avoided. This risk exists particularly in vertical areas of the heat insulation system, for example at the vertical walls of a prestressed concrete pressure vessel. In these areas of the building section to be protected, the ceramic fiber material is held in position by vertical forces of friction between the fibers and its boundary walls. The force of friction must be greater than the weight of the fiber mats to avoid a collapsing of the fiber mats between these boundary walls and thus a decrease in their dimensional stability. A restoring force must be present which has still not disappeared even after all possible accidents. This must be obtained at the cost of initially higher compression of the fiber mats since, as is known, the restoring force becomes less with time and due to the effects of temperature and water.

German patent specification No. 29 49 726 shows a heat insulation system intended for a gas duct for connecting the hot gas collection space of a gas-cooled high temperature reactor to a steam generator. The insulating material consists of several layers or plies which are separated from one another by intermediate plates. Lining plates can be provided between the insulating material layers and the intermediate plates. The rectangular cover plates are fixed in position by centrally arranged holding boxes as is usual and are additionally held by bolts provided at the corners of the cover plates. Furthermore, convection barriers are also arranged in the insulating material. The convection barriers are frames which enclose one layer of the insulating material.

A further thermally insulated gas duct is described in German Offenlegungsschrift 29 45 877. Cover plates attached to the support structure cover the insulating material of the hot side. Plies of ceramic fiber mats which are slightly compressed by the cover plates can be used as insulating material. In this case, however, the plies are not separated by intermediate plates. Spacing sleeves are pushed onto the holding bolts of the cover plates in order to render the position of the cover plates independent of the restoring forces of the insulating material.

German Offenlegungsschrift 29 45 921 shows a high permeability thermal insulation for the inside wall of a prestressed concrete pressure vessel. The insulation consists of individual plies of insulating material separated by intermediate plates, cover plates and holding bolts. In this case, a multiplicity of loose steel strips are used as insulating material and a sealing foil which is closely welded together over its entire area is applied to the topmost layer of the intermediate plates.

Patent application Ser. No. P 38 12 572.2, shows a heat insulation system having several plies of slightly compressed ceramic fiber mats. Rectangular cover plates are attached to the hot side of the fiber mats. Intermediate plates are arranged between the plies of the fiber mats. The intermediate plates may hold the fiber mats and seal the insulation. The intermediate plates act to transfer force in vertical areas. A multiplicity of holding bolts are mounted on a support structure situated on the cold side of the fiber mats. The bolts penetrate through holes in the cover plates, the fiber mats and the intermediate plates.

The current invention is an improvement on DE No. 38 12 572. The intermediate plates are constructed as nail plates and have nails on both sides. The nails are supported against the centrally arranged holding bolts in the cover plates. The nails transfer the forces from the fiber mats to the intermediate plates.

SUMMARY OF THE INVENTION

An object of the invention is development of an inexpensive heat insulation system in such a manner that both the metallic mounting system and the ceramic insulating material remain fully functional over the entire service life of the structural part to be protected. This object may be achieved by configuring the thickness and size of the cover plates to optimize stresses occurring at the edge of the holes. Additionally, one or more sealing sleeves may be arranged on each holding bolt. According to an advantageous feature the force transfer elements provided on the intermediate plates in vertical areas of the heat insulation system may be configured as lug-shaped points stamped out on both sides of the intermediate plates. The points transfer the weight forces of the fiber mats to the intermediate plates. Alternatively, the force transfer elements provided on the intermediate plates are arranged at least in vertical areas of the insulation system and configured as layers of expanded metal which transfer the weight forces of the fiber mats to the holding bolts. The expanded metal portion may be corrugated so as to intrude into the planes defined by both abutting fiber mats. The corrugations may be formed by stamping the intermediate plates. The expanded metal may be a mesh or grating produced by stamping and subsequently pulling apart or "stretching" a steel or aluminum plate. This material may be of the type used as construction reinforcing inserts.

A low level of stress is essential for the resistance against failure of the metallic mounting system. In the case of the holding bolts, such a stress level exists. A low stress bolt arrangement and a suitable production method and full-volume testing of the welds, ensures holding bolts failure resistance. Maximum stresses occur in the area of the hole edges of cover plates. For this reason, an optimization between plate thickness and plate size is effected with respect to these hole edge stresses.

According to an advantageous feature the cover plates may exhibit a reinforced hole edge surrounding the holding bolt holes. Furthermore, the corner plates may be welded to the holding bolts. This provides a redundant mounting arrangement and serves as an assembly aid.

The resistance against failure of the insulating material is closely connected to the prevention or minimization of convection within the insulating material and retention of the fiber mats are by frictional forces even against vertical walls. According to the invention, forced convection may be reduced or prevented by a sealing sleeve arranged on each holding bolt. A sealing plate can also be provided directly underneath the cover plates. The intermediate plates arranged between the plies of the fiber mats may serve as holding and sealing plates to prevent natural convection within the insulating material and to fix the insulating material against vertical walls. They are suspended from the holding bolts. The force is transmitted from the insulating material to the intermediate plates either via lug-shaped points on some intermediate plates which can be stamped from the plate on both sides in one work cycle, or via expanded metal arranged between the fiber mats. In the first case, the lug-shaped points hold the fiber mats in a dimensionally stable manner irrespective of the depth of the insulating ply and are to be considered as a redundant measure in addition to the pretension and friction forces. The pretension and friction forces decrease during the service life. The mats are supported between the points by the mutual intertwisting of the individual fibers in the microscopic domain. Macroscopically, the load of the vertical own-weight forces of the insulating mats is removed via the lug-shaped points and from there via the holding bolts to the support structure.

In a second solution, the intermediate plates provided with lug-shaped points, which ensure the stability of the insulating material, are replaced by layers of expanded metal which are arranged between the plies of the fiber mats. When the insulating material is compressed during assembly, the expanded metal presses into the fiber material. In this manner, the vertical own-weight forces of the insulating mats can be transferred to the dimensionally stable expanded metal and from there to the holding bolts.

The intermediate plates act not only as convection barriers but also limit the moisture penetrating into the insulating material in the event of a water penetration. Such a possibility is given when the heat insulation system is used for the thermal insulation of a primary circuit component of a nuclear reactor and a steam generator pipe fracture occurs.

In the first solution, the perforation of the intermediate plates at the locations of the stamped-out points also facilitates the driving-out of the moisture and by this means shortens the required drying time. The perforation also ensures sufficient pressure relief for the fiber mats plies in the case of a pressure decrease in the primary circuit.

It is also an advantageous effect that the carrying-out of the fibers into the primary circuit is reduced by the intermediate plates.

In an advantageous further development of the invention, the high stress level at the cover plate hole edges can be reduced by reinforcing the hole edges. A reduction of the hole edge stresses can also be achieved by enlarging the hole diameter.

Although the holding bolts do not require any further securing since they are resistant against failure, such securing can be effected by the fact that corner plates are welded to the holding bolts as an assembly aid. These form a redundant and versatile securing point for the cover plates and hold them in the event of a failure of a holding bolt.

A section from a heat insulation system is shown diagrammatically as an illustrative embodiment of the invention.

DETAILED DESCRIPTION OF THE PREFERRED EMBODIMENT

Figure 1:
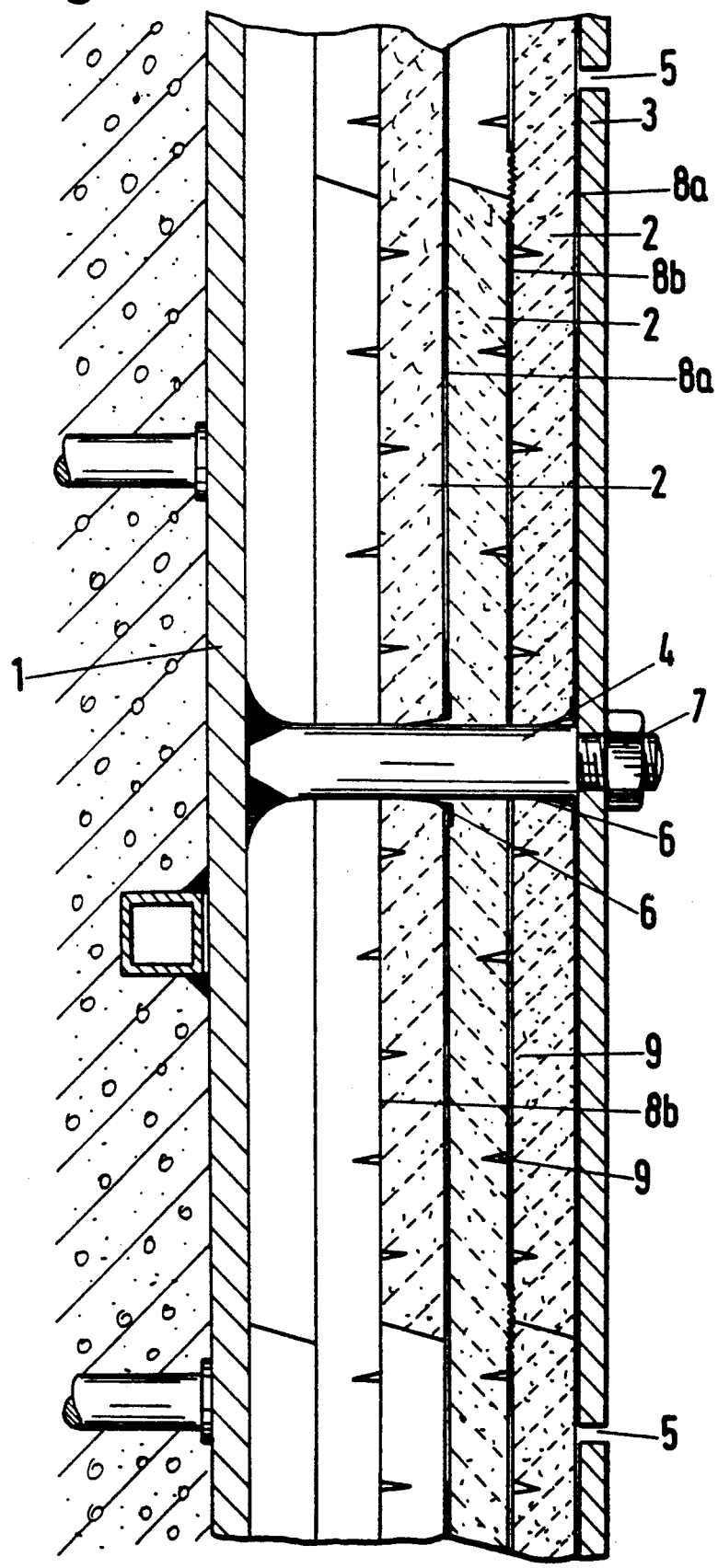
FIG. 1 shows a longitudinal section.
Figure 2:
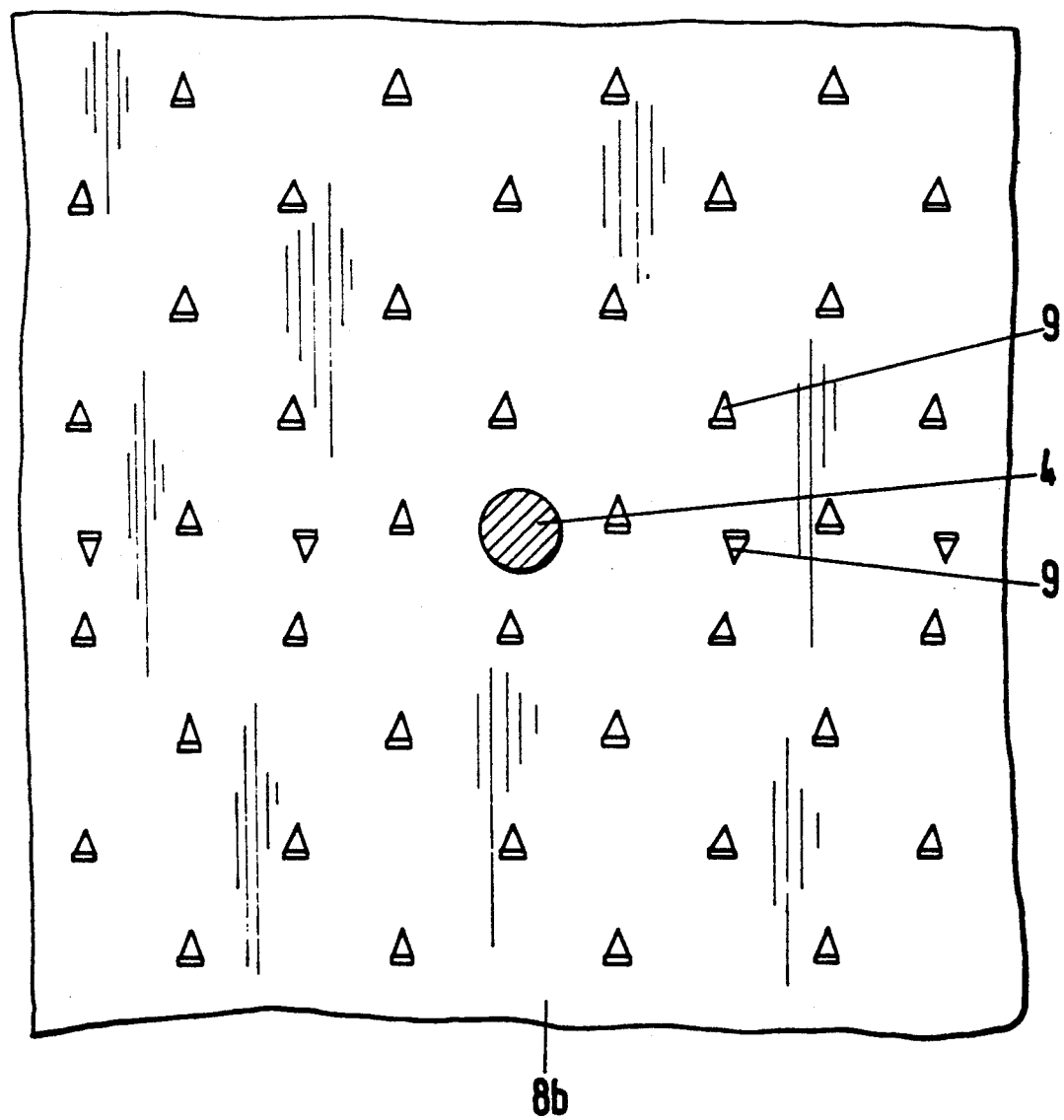
FIG. 2 shows a top view section of an intermediate plate.

FIGS. 1 and 2 show a part of a heat insulation system which is used, for example, for protecting a nuclear pressure vessel. It is attached to a support structure 1, such as the liner of this pressure vessel. The insulating material may be five plies of ceramic fiber mats 2 which are slightly compressed. The fiber mats 2 are compressed with the aid of rectangular cover plates 3 which are provided on the hot side of the fiber mats 2. They are mounted on the support structure 1 by holding bolts 4, one of which is, in each case, arranged in the center of a cover plate 3. Expansion joints 5 are located between the individual cover plates 3.

The holding bolts 4 penetrate the cover plates 3 and the fiber mats 2. The bolts are arranged in holes of the plates and mats. Sealing sleeves 6 are pushed onto the holding bolts 4 for sealing. The sealing sleeves may be secured to the holding bolts by welds or other suitable means. Thickness and size of the cover plates 3 are optimized with regard to the stresses occurring at the hole edges. The holes can also exhibit a reinforced edge. The holding bolts 4 are welded to the support structure 1; nuts are screwed onto the holding bolts 4 on the hot side.

The heat insulation system exhibits several intermediate plates or sheets 8, which are used as sealing and holding plates and are in each case arranged between two plies of the fiber mats 2. In the illustrative embodiment shown, some of the intermediate plates 8 are specially constructed as sealing plates 8a and are connected to the sealing sleeves 6. The topmost sealing plate 8a is situated immediately underneath the cover plates 3. The remaining intermediate plates are used as holding plates 8b, which have the task of fixing the fiber mats 2 predominantly at the side walls of the nuclear reactor pressure vessel, even in accidents, and thus of ensuring the resistance against failure of the heat insulation system. For this purpose, lug-shaped, fish plate or fish scale points 9, which transfer the weight forces of the fiber mats 2 to the holding plates 8b are stamped out of the holding plates 8b on both sides. The holding plates 8b and the sealing plates 8a are supported on the holding bolts 4.

As can be seen in FIG. 2, the lug-shaped points are arranged in a pattern, the points 9 provided on one plate side being staggered with an offset compared with those on the other plate side.

The holding plates 8b and the sealing plates 8a act at the same time as convection barriers.

What is claimed is:

1. A hot gas conduction path heat insulation system comprising:
    a plurality of holding bolts mounted on a support structure;
    a plurality of layers of slightly compressed ceramic fiber mats mounted against said support structure, wherein said holding bolts extend through said layers;
    rectangular cover plates mounted against said mats wherein said holding bolts extend through cover plate mounting holes;
    intermediate sheets arranged between said layers of slightly compressed ceramic fiber mats exhibiting a plurality of force transfer elements, wherein said force transfer elements are lug-shaped points stamped out on opposing sides of said intermediate plates, and wherein said holding bolts pass through holes defined in said intermediate plates; and
    sealing sleeves arranged on said holding bolts.

2. A system according to claim 1 wherein said rectangular cover plates exhibit a reinforced hole edge surrounding and defining said mounting holes.

3. A system according to claim 1 wherein corner rectangular cover plates are welded to said holding bolts.

4. A system according to claim 1 wherein an expansion gap is defined between adjacent mounting plates.

5. A system according to claim 1 wherein said support structure is a pressure vessel liner.

6. A system according to claim 1 wherein said plurality of layers comprises five layers of ceramic fiber mats.

7. A system according to claim 1 further comprising a retaining nut mounted on said holding bolts.

8. A system according to claim 1 wherein said intermediate sheets are connected to said sealing sleeves.

9. A hot gas conduction path heat insulation system comprising:
    a plurality of holding bolts mounted on a support structure;
    a plurality of layers of slightly compressed ceramic fiber mats mounted against said support structure, wherein said holding bolts extend through said layers;
    rectangular cover plates mounted against said mats wherein said holding bolts extend through cover plate mounting holes;
    intermediate sheets arranged between said layers of slightly compressed ceramic fiber mats exhibiting a plurality of force transfer elements, wherein said force transfer elements are areas of expanded metal of said intermediate plates, and wherein said holding bolts pass through holes defined in said intermediate plates; and
    sealing sleeves arranged on said holding bolts.

10. A system according to claim 9 wherein said rectangular cover plates exhibit a reinforced hole edge surrounding and defining said mounting holes.

11. A system according to claim 9 wherein corner rectangular cover plates are welded to said holding bolts.

12. A system according to claim 9 wherein an expansion gap is defined between adjacent mounting plates.

13. A system according to claim 9 wherein said support structure is a pressure vessel liner.

14. A system according to claim 9 wherein said plurality of plies comprises five layers of ceramic fiber mats.

15. A system according to claim 9 further comprising a retaining nut mounted on said holding bolts.

16. A system according to claim 9 wherein said intermediate sheets are connected to said sealing sleeves.

* * * * *